United States Patent
Pontecorvo

(10) Patent No.: US 6,686,408 B2
(45) Date of Patent: Feb. 3, 2004

(54) METHOD OF PREPARING CURABLE-RUBBER MIXTURES CONTAINING SILICA, FOR PRODUCING TREADS

(75) Inventor: Mauro Pontecorvo, Cerveteri (IT)

(73) Assignee: Bridgestone Corporation, Tokyo (JP)

( * ) Notice: Subject to any disclaimer, the term of this patent is extended or adjusted under 35 U.S.C. 154(b) by 209 days.

(21) Appl. No.: 09/882,662

(22) Filed: Jun. 15, 2001

(65) Prior Publication Data

US 2002/0016403 A1 Feb. 7, 2002

(30) Foreign Application Priority Data

Jun. 20, 2000 (IT) ................ TO2000 A 000593

(51) Int. Cl.$^7$ ................................ C08K 3/34
(52) U.S. Cl. .................... 524/492; 152/209.5
(58) Field of Search ............... 524/496, 493, 524/494, 492; 525/332.4, 332.5, 332.6, 332.9, 333.1, 333.2, 333.3, 333.5

(56) References Cited

U.S. PATENT DOCUMENTS

| | | | |
|---|---|---|---|
| 5,162,409 A | 11/1992 | Mroczkowski | 524/262 |
| 5,227,425 A | 7/1993 | Rauline | 524/493 |
| 5,534,574 A | 7/1996 | Sandstrom et al. | 524/262 |
| 5,580,919 A | 12/1996 | Agostini et al. | 524/430 |
| 5,674,932 A | 10/1997 | Agostini et al. | 524/430 |
| 5,696,197 A * | 12/1997 | Smith et al. | 524/495 |
| 5,733,963 A | 3/1998 | Sandstrom et al. | 524/492 |
| 5,760,110 A | 6/1998 | Zimmer et al. | 524/83 |
| 5,773,504 A * | 6/1998 | Smith et al. | 524/492 |
| 5,804,636 A | 9/1998 | Nahmias et al. | 524/492 |
| 5,916,951 A | 6/1999 | Nahmias et al. | 524/492 |
| 6,046,266 A | 4/2000 | Sandstrom et al. | 524/492 |
| 6,136,913 A | 10/2000 | Nahmias et al. | 524/492 |
| 6,469,101 B2 * | 10/2002 | Nahmias et al. | 525/132 |
| 2002/0019484 A1 * | 2/2002 | Nahamias et al. | 525/132 |
| 2002/0103282 A1 * | 8/2002 | Hromadkova | 524/423 |
| 2002/0151640 A1 * | 10/2002 | Datta et al. | 524/493 |

FOREIGN PATENT DOCUMENTS

| | | |
|---|---|---|
| EP | 0 821 029 | 1/1978 |
| EP | 0 744 438 | 11/1996 |
| EP | 0 763 558 | 3/1997 |
| EP | 0 972 790 | 1/2000 |

OTHER PUBLICATIONS

Byers, John T. (1998) Silane coupling agents for enhanced silica performance. Rubber World, Sep., pp. 38–47.

Wolff, S. (1981) Reinforcing and vulcanization effects of silane Si69 in silica–filled compounds. Kaautschuk Gummi–Kunststoffe 34, 280–284.

Wolff, S. (1982) Optimization of silane–silica OTR compounds. Part 1: ariations of mixing temperature and time during the modification of silica with bis–(3–triethoxysilylpropyl)–tetrasulfide. Rubber Chemistry and Technology 55, 967–989.

Hasse A & H.D. Luginsland (2000) Processing of organo polysulfane silanes. Tire Technology International, Mar. 2000, pp. 52–59.

Luginsland, H. & Hürth–Kalscheuren (2000). Reactivity of the sulfur chains of the tetrasulfane silane Si69 and the disulfane silane TESPD. KGK Kautschuk Gummi Kunststoffe 53, 10–23.

* cited by examiner

Primary Examiner—Edward J. Cain
Assistant Examiner—Katarzyna Wyrozebski Lee
(74) Attorney, Agent, or Firm—Barbara Arndt; Meredith Palmer

(57) ABSTRACT

A method of preparing curable-rubber mixtures containing silica, for producing treads, wherein, in the course of a first step, at least a cross-linkable unsaturated-chain polymer base, a silica-based reinforcing filler, and a silane bonding agent are loaded simultaneously and mixed together inside a mixer, the first step being stopped on reaching a temperature ranging from 155° C. to 175° C.; wherein, in the course of a second step, at least one noncuring ingredient is added to and homogeneously dispersed in the mixture being prepared, the second step being stopped on reaching a temperature ranging from 145° C. to 175° C.; and wherein, in the course of a third step, at least one curing agent is added to and homogeneously dispersed in the mixture being prepared; the third step being stopped at a temperature below the curing temperature.

41 Claims, No Drawings

METHOD OF PREPARING CURABLE-RUBBER MIXTURES CONTAINING SILICA, FOR PRODUCING TREADS

The present invention relates to a method of producing curable-rubber mixtures containing silica, for producing treads.

Here and hereinafter:

the term "silica" is intended to mean a silicon dioxide-based reinforcing agent, silicates, and mixtures thereof;

the term "cross-linkable unsaturated-chain polymer base" is intended to mean any natural or synthetic noncross-linked polymer capable of assuming all the chemical, physical and mechanical characteristics typical of elastomers following cross-linking (curing) with sulfur-based systems;

the term "mixture containing silica" is intended to mean a mixture containing reinforcing agents which definitely comprise silica, but which may also comprise, among other things, carbon black.

In the tire manufacturing industry, to minimize tire rolling resistance, carbon black, as a reinforcing filler, is replaced partly or fully by inorganic reinforcing fillers, such as chalk, talc, kaolin, bentonite, titanium dioxide, various types of silicate and, above all, silica.

Silica poses various drawbacks by being difficult to disperse in the polymer base, and, if dispersed poorly within the mixture, results in a mixture with highly variable, heterogeneous physical and mechanical characteristics.

The reason for this problem lies in the presence, on silica, of surface silanolic groups, which assist the formation of hydrogen bonds and, hence, silica particle clusters, and impart to the silica hydrophilic characteristics incompatible with the hydrophobic characteristics of rubber.

To solve the above dispersion problems, use has been made for some time now (see, for example, EP-B-0447066) of silane bonding agents, which prevent the formation of hydrogen bonds by bonding with silanolic groups, and, at the same time, chemically attach the silica to the polymer base.

The silica-silane bonding agent reaction is a critical passage in the preparation of mixtures containing silica, by requiring conformance with given temperature conditions. That is, the reaction must be conducted at a temperature of over 140° C. to permit the reaction to take place rapidly, but below 175° C. to prevent premature curing of the mixture. Moreover, the silica-silane bonding agent reaction produces a by-product of ethyl alcohol, which, on evaporating, is responsible, together with the water in the silica, for the formation of porous zones seriously impairing the dimensional stability of treads, so that a low tread strip drawing speed must be maintained to ensure the drawn product conforms with specifications.

In known methods of preparing mixtures containing silica, the silica-silane bonding agent reaction is made to occur after the polymer base has been mixed with other normally used ingredients. That is, known methods comprise a first mixing step, in which the polymer base is mixed with other ingredients; and a second mixing step, in which the mixture produced in the first step is mixed with silica and the silane bonding agent to bring about the silica-silane bonding agent reaction.

Alternatively, known methods provide for adding silica to the polymer base in the first step, and the silane bonding agent in the second step to bring about the silica-silane bonding agent reaction.

SUMMARY OF THE INVENTION

The above methods of preparing mixtures containing silica have several drawbacks, by failing to provide for correct silica dispersion, and by involving severe porosity initiating phenomena. That is, while successfully removing part of the water in the silica, they fail to remove the ethyl alcohol produced by the silica-silane bonding agent reaction, and, at the same time, have such low MOONEY scorch values as, at times, to impair the workability of the mixture.

Moreover, normally used methods can be extremely time-consuming when viewed in terms of output requirements and the number of production cycles performed on each production unit.

The present invention provides a method of preparing curable-rubber mixtures containing silica, for producing treads—in particular, for passenger road vehicles, and which provides for ensuring correct silica dispersion in the polymer base and a substantial reduction in porosity by removing ethyl alcohol, as well as for higher MOONEY scorch values together with greater output.

According to the present invention, there is provided a method of preparing curable-rubber mixtures containing silica, for producing treads, the method being characterized by comprising at least a first step to obtain a first mixture by simultaneously loading into a mixer and mixing together at least a cross-linkable unsaturated-chain polymer base, a silica-based reinforcing filler, and a silane bonding agent; said first step being arrested upon said first mixture reaching a temperature ranging from 155° C. to 175° C.

The method defined above preferably comprises a second step to obtain a second mixture by adding to and dispersing in the first mixture at least one noncuring ingredient, said second step being arrested on reaching a temperature ranging from 145° C. to 175° C.; and a third step to obtain a third mixture by adding to and dispersing in the second mixture at least one curing agent, said third step being arrested at a temperature below a curing temperature of the third mixture.

Preferably, at least in said first step the ingredients are mixed together in one uninterrupted mixing comprising a first part, in which said mixer is operated at a relatively high first mixing speed, said first part terminating on reaching a temperature ranging from 120 to 145° C.; and a second successive part, in which said mixer is operated at a second mixing speed lower than the first speed and such as to maintain the mixture at a temperature ranging from 150 to 165° C.

Preferably, both said first step and said second step comprise said first part at said first mixing speed, and said second successive part at said second mixing speed.

Preferably, said first mixing speed ranges from 50 to 80 rpm, whereas said second mixing speed ranges from 20 to 50 rpm; the difference between said two mixing speeds being at least 10 rpm.

In the method defined above, part of the silica is preferably also added in the second step.

The amount of silica added in the first step preferably constitutes 50% to 75% by weight of the total amount of silica used.

The method set forth above preferably comprises, between the second and third step, a further remixing step, in which no ingredients are added, and which is stopped on reaching a temperature ranging from 135° C. to 175° C.

Preferably, said further remixing step comprises said first part at said first mixing speed, and said second successive part at said second mixing speed.

In the method defined above, a carbon black-based reinforcing filler is preferably added in the first step.

Further embodiments are identified in the Examples.

EXAMPLES

The examples disclosed hereinbelow comprise three silica-containing mixtures obtained both in accordance with the method of the present invention and according to the known state of the art. In particular two of the mixtures are respectively obtained in two different ways in accordance with the method of the present invention.

For each one of the mixtures, identical in parts and weight, but obtained in different ways, the physical characteristics are compared.

It should also be pointed out that, in preparing each mixture in accordance with the known state of the art, care was taken, at each processing step, to adopt the same mixer fill factor as in the corresponding step according to the teachings of the invention method, so as to show how the advantages of the method according to the invention derive solely from a different processing method, as opposed to different processing conditions.

The silica-based reinforcing filler used ranges from 20 to 85 parts by weight per 100 parts of polymer base.

The amount of silane bonding agent used ranges from 1% to 20% by weight of the silica-based reinforcing filler.

For the purposes of the invention, preferred cross-linkable unsaturated-chain polymer bases are unsaturated-chain polymers or copolymers obtained by polymerizing conjugated dienes and/or aliphatic or aromatic vinyl monomers.

More specifically, the polymer bases is selected from the group consisting of: natural rubber, cis-1,4-polyisoprene, cis-1,4-polybutadiene, isobutene-isoprene copolymers, possibly halogenated, acrylonitrile-, butadiene-styrene and isoprene-butadiene-styrene terpolymers, either in solution or emulsion, and ethylene-propylene-diene terpolymers.

The above polymer bases are used singly or mixed, depending on the characteristics to be imparted to the finished product.

For the purposes of the invention, a silane bonding agent has the following structural formula:

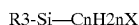    (I)

where:

R is an alkyl or alkoxy group comprising 1 to 4 carbon atoms or one chlorine atom;
n is a whole number from 1 to 6;
x is a group selected from —Sm—Cn'H2n'—Si—R'3, where:

m and n' are whole numbers from 1 to 6,
  R' is butadiene an alkyl or alkoxy group comprising 1 to 4 carbon atoms or one chlorine atom.

In formula (I), particularly advantageous bonding agents are bis(3-triethoxysilyl-propyl)tetrasulfide and bis(3-triethoxysilyl-propyl)disulfide, marketed by DEGUSSA as Si69 and Si75 respectively.

In all the examples, the term "mixer (1)" indicates a POMINI 270-liter tangential-rotor mixer (Banbury), and the term "mixer (2)" a HOMRICH 330-liter tangential-rotor mixer (Banbury).

Example 1
Preparation of a Curable-Rubber Mixture A
(Step I)
A "mixer (1)" was loaded simultaneously with 81.67 kg of S-SBR, 40.11 kg of E-SBR, 35.73 kg of carbon black, 25.28 kg of silica, 3.32 kg of silane bonding agent, and smaller amounts of other commonly used ingredients.

The characteristics of the ingredients used were the following:

S-SBR=butadiene-styrene copolymer solution;
E-SBR=butadiene-styrene copolymer emulsion;
Carbon black=N115 (Cabot Corporation) type;
Silica=ULTRASIL VN3 (Degussa) type;
Silane bonding agent=Si75 (Degussa) type.

"Mixer (1)" was operated at a speed of 50 rpm for 116 seconds, corresponding to attainment of a temperature of 170° C., to obtain 190 kg of a silica-containing mixture A'.

The above step was repeated to obtain a further 190 kg of mixture A'.
(Step II-a)
Of the 380 kg of mixture A', 235.54 kg (this value depends, as already stated, on the need to conform with a given fill coefficient) were loaded into a "mixer (2)" and added to 13.26 kg of silica of the above type, and to smaller amounts of other commonly used ingredients. "Mixer (2)" was operated at a speed of 50 rpm for 72 seconds, corresponding to attainment of a temperature of 170° C., to obtain 250 kg of a silica-containing mixture A".
(Step II-b)
Mixture A" was cooled and mixed further in a "mixer (2)" operated at 50 rpm for 86 seconds, corresponding to attainment of a temperature of 170° C.
(Step III)
After the above mixing operation, 198.73 kg of mixture A" were loaded into a "mixer (1)" and added to 6.27 kg of commonly used curing agents. "Mixer (1)" was operated at 35 rpm for 98 seconds, corresponding to attainment of a temperature of 110° C., to obtain 205 kg of a final silica-containing mixture A, the composition of which, expressed in parts by weight, is shown in Table I.

TABLE I

| | |
|---|---|
| SBR | 100 |
| Carbon black | 30 |
| Silica | 30 |
| Silane agent (Si75) | 3 |
| Wax | 1 |
| Stearic acid | 1 |
| Antioxidant | 1 |
| Zinc oxide | 2 |
| Curing agents | 4 |

Example 2
Preparation of a Curable-Rubber Mixture B—(Comparison: Silica and Bonding Agent Added in the Second Step)
(Step I)
A "mixer (1)" was loaded with 96.14 kg of S-SBR, 47.21 kg of E-SBR, 42.06 kg of carbon black, and smaller amounts of other commonly used ingredients.

The characteristics of the ingredients used are as indicated in Example 1.

"Mixer (1)" was operated at a speed of 50 rpm for 120 seconds, corresponding to attainment of a temperature of 180° C., to obtain 190 kg of a nonsilica mixture B'.

The above step was repeated to obtain a further 190 kg of mixture B'.
(Step II-a)
Of the 380 kg of mixture B', 200.09 kg (this value depends, as already stated, on the need to conform with a given fill coefficient) were loaded into a "mixer (2)" and added to 44.60 kg of silica, 4.11 kg of silane bonding agent, and to smaller amounts of other commonly used ingredients. The characteristics of the silica and silane bonding agent are as indicated in Example 1.

"Mixer (2)" was operated at a speed of 50 rpm for 105 seconds, corresponding to attainment of a temperature of 170° C., to obtain 250 kg of a silica-containing mixture B".

(Step II-b)

Mixture B" was cooled and mixed further in a "mixer (2)" operated at 50 rpm for 73 seconds, corresponding to attainment of a temperature of 170° C.

(Step III)

After the above mixing operation, 198.73 kg of mixture B" were loaded into a "mixer (1)" and added to 6.27 kg of commonly used curing agents, at any rate identical to those used in Example 1. "Mixer (1)" was operated at 35 rpm for 87 seconds, corresponding to attainment of a temperature of 110° C., to obtain 205 kg of a final mixture B having the same composition as mixture A in Table I.

Example 3

Preparation of a Curable-Rubber Mixture C

The method described in Example 1 was repeated, only this time using as a polymer base a SBR/NR mixture (NR=SMR20 type natural rubber), to obtain a silica-containing mixture with the composition, expressed in parts by weight, shown in Table III

TABLE III

| SBR/NR | 80/20 |
|---|---|
| Carbon black | 32 |
| Silica | 32 |
| Silane agent (Si75) | 3 |
| Wax | 1.7 |
| Stearic acid | 2 |
| Antioxidant | 1 |
| Zinc oxide | 2.5 |
| Curing agents | 4.1 |

Example 4

Preparation of a Curable-Rubber Mixture D

In this example, the method used in Example 3 was repeated with some differences: a mixer (1) for step I and a mixer (2) for the step II-a were operated at a variable speed, and step II-b is missing.

In particular:

In step I, a mixer (1) was operated at a speed of 70 rpm up to a temperature of 130° C.; at this point, the mixer (1) was slowed down to 50 rpm up to a temperature of 170° C. The total time of step I was 107 seconds In step II-a a mixer (2) was operated at a speed of 50 rpm up to a temperature of 130° C.; at this point, the mixer (2) was slowed down to 30 rpm up to a temperature of 160° C. The total time of step II-a was 95 seconds.

Step II-b is missing.

The amounts used were selected to obtain a mixture having the same composition as mixture C in Example 3 and as shown in Table III.

Example 5

Preparation of a Curable-Rubber Mixture E—(Comparison: Bonding Agent Added in the Second Step)

The method described in Example 2 for preparing mixture B was repeated, only this time adding silica in the first step and the bonding agent in the second step. The amounts used were selected to obtain a mixture having the same composition as mixture C in Example 3 and as shown in Table III.

Example 6

Preparation of a Curable-Rubber Mixture F—

The method described in Example 1 for preparing mixture A was repeated, only this time using a SBR/NR mixture (NR=SMR10 type natural rubber) as a polymer base, and a Si69 (Degussa) type silane bonding agent, which has a structural stability weaker than the silane bonding agent referred to as Si75.

Because of this weakness of the Si69 in steps I, II-a and II-b, the mixing temperatures reached were lower than those described in Example 1.

In particular:

in step I, a mixer (1) was operated for 90 seconds reaching a temperature of 155° C.;

in step II-a, a mixer (2) was operated for 65 seconds reaching a temperature of 155° C.; and in step II-b, the mixer (2) was operated for 65 seconds reaching a temperature of 155° C.

The other parameters (e.g. the mixing and the order in which ingredients were added) were maintained the same as those described in Example 1.

A silica-containing mixture was obtained with the composition expressed in parts by weight, shown in Table VI.

TABLE VI

| SBR/NR | 80/20 |
|---|---|
| Carbon black | 32 |
| Silica | 32 |
| Silane agent (Si69) | 3 |
| Wax | 1.7 |
| Stearic acid | 2 |
| Antioxidant | 1 |
| Zinc oxide | 2.5 |
| Curing agents | 4.1 |

Example 7

Preparation of a Curable-Rubber Mixture G

In this example the method used in Example 6 was repeated with some differences: a mixer (1) for step I and a mixer (2) for step II-b were operated at a variable speed, all the silica amount was added in step I, and step II-a is missing.

In particular:

In step I, a mixer (1) was operated at a speed of 70 rpm up to a temperature of 130° C.; at this point, the mixer (1) was slowed down to 50 rpm up to a temperature of 155° C. The total time of step I was 83 seconds.

Step II-a is missing.

In step II-b, a mixer (2) was operated at a speed of 50 rpm up to a temperature of 130° C.; at this point, the mixer (2) was slowed down to 30 rpm up to a temperature of 155° C. The total time of step II-a was 80 seconds.

The mixture obtained had the same composition as mixture C in Example 6 and as shown in Table VI.

Example 8

Preparation of a Curable-Rubber Mixture H—(Comparison: Bonding Agent Added in the Second Step)

The method described in Example 5 for preparing mixture D was repeated, only this time using a Si69 (Degussa) type silane bonding agent. The amounts used were selected to obtain a mixture having the same composition as mixture F in Example 6 and as shown in Table VI.

Example 9
Laboratory Test Results of Specimens Obtained from Mixtures A, B, C, D, E, F, G and H Specimens were taken from each of the mixtures in Examples 1 to 6 and tested to determine, for each mixture, the values of a number of particularly significant parameters.

The parameters considered were the following:

viscosity (ML1'+4' at 130° C.) and Mooney scorch at 130° C. expressed in minutes, measured in accordance with ASTM standard D1646;

physical property values (ultimate elongation, fracture strength, M300% modulus values), measured in accordance with ASTM standard D412C;

silica dispersion, assessed on the basis of the Payne effect coefficient as described in "RUBBER CHEM. TECHNOL." (1971) by Payne and Whittaker; the Payne effect is the difference between the elasticity modulus (E') at 5% and the elasticity modulus (E') at 0.3%; though not shown, the elasticity moduli were measured in accordance with ASTM standard D5992;

% porosity values measured on the drawn treads and calculated according to the equation:

$$[(Dc-Dg)/Dc] \times 100$$

Dc=specific weight of cured specimen
Dg=specific weight of green specimen
The test results are shown in Table IX below.

TABLE IX

| MIXTURE | A | B (Comparison) | C | D | E (Comparison) | F | G | H (Comparison) |
|---|---|---|---|---|---|---|---|---|
| ML1' + 4' at 130° C. | 84 | 82 | 60 | 55 | 56 | 55 | 50 | 51 |
| MOONEY SCORCH (mm) | 15.9 | 14.2 | 13.86 | 13.9 | 11.59 | 14.0 | 14.2 | 13.12 |
| FRACTURE STRENGTH* (MPa) | 20.5 | 22.4 | 21.1 | 20.5 | 19.7 | 23.1 | 23.0 | 21.1 |
| 300% MODULUS* (MPa) | 13.73 | 13.79 | 12.8 | 13.1 | 11.8 | 13.3 | 13.2 | 12.9 |
| ULTIMATE ELONGATION* (MPa) | 402 | 433 | 433 | 430 | 435 | 469 | 452 | 441 |
| FRACTURE STRENGTH** (MPa) | 20.2 | 20.8 | 21.0 | 21.0 | 20.0 | 20.0 | 20.5 | 20.6 |
| 300% MODULUS** (MPa) | 15.95 | 15.51 | 14.30 | 14.2 | 13.83 | 14.83 | 14.6 | 14.53 |
| ULTIMATE ELONGATION** (MPa) | 366 | 381 | 404 | 406 | 391 | 393 | 405 | 388 |
| POROSITY (%) | 3 | BLISTERING | 5 | 5 | 6 | 3 | 3 | 7 |
| PAYNE COEFFICIENT | 1.07 | 1.19 | 1.08 | 1.2 | 1.46 | 1.76 | 1.6 | 2.04 |

*non-aged mixture
**aged mixture

As shown in Table VII, with respect to the comparison Examples, the mixtures produced using the method according to the invention show better silica dispersion, as deduced from the lower Payne coefficient values, much lower porosity, and higher Mooney scorch times.

Another important point to note is the considerable reduction in processing time, with respect to the comparison mixtures, of the mixtures obtained using the method according to the invention. In this connection, it should be stressed that, whereas the method according to the invention does not necessarily call for a further remixing step (step II-b in the Examples), methods according to the known state of the art, wherein the silane bonding agent is added in the second step, call for a compulsory remixing step to promote a correct silica-silane bonding agent reaction. In particular, as seen in examples 4 and 7, the method comprising a variation of the mixing speed has fewer mixing steps, and maintains the mixture viscosity at acceptable values.

The invention is not limited to the above embodiments. The claims follow.

What is claimed is:

1. A method of preparing curable-rubber mixtures containing silica, for producing treads, the method being characterized by comprising at least a first step to obtain a first mixture by simultaneously loading into a mixer and mixing together at least a cross-linkable unsaturated-chain polymer base, a silica reinforcing filler, and a silane bonding agent; wherein the ingredients are mixed together in one uninterrupted mixing comprising a first part, in which said mixer is operated at a first mixing speed, the first part terminating on reaching a temperature ranging from 120° C. to 145° C., and a second successive part, in which the mixer is operated at a second mixing speed lower than the first mixing speed, the second mixing speed maintaining a temperature ranging from 150° C. to 165° C.

2. A method as claimed in claim 1, and further comprising a second step to obtain a second mixture by adding to, and dispersing in, the first mixture at least one non-curing ingredient, said second step being arrested on reaching a temperature ranging from 145° C. to 175° C.; and a third step to obtain a third mixture by adding to, and dispersing in, the second mixture at least one curing agent; said third step being stopped at a temperature below a curing temperature of the third mixture.

3. A method as claimed in claim 1, wherein said first mixing speed ranges from 50 to 80 rpm, whereas said second mixing speed ranges from 20 to 50 rpm; the difference between said two mixing speeds being at least 10 rpm.

4. A method as claimed in claim 2, wherein part of the silica reinforcing filler is also added in the second step.

5. A method as claimed in claim 4, wherein the amount of silica reinforcing filler added in the first step constitutes 50% to 75% by weight of the total amount of silica used.

6. A method as claimed in claim 2, wherein a carbon black reinforcing filler is added in the first step.

7. A method as claimed in claim 1, wherein the amount of silica reinforcing filler ranges from 20 to 85 parts by weight per 100 parts of polymer base.

8. A method as claimed in claim 1, wherein the amount of silane bonding agent used ranges from 5% to 15% by weight of the amount of silica reinforcing filler.

9. A method as claimed in claim 1, wherein the cross-linkable unsaturated-chain polymer base is selected from the group consisting of natural rubber, cis-1,4-polyisoprene, isobutene-isoprene copolymers, halogenated rubbers, acrylonitrile-butadiene, solution butadiene-styrene copolymers, emulsion butadiene-styrene copolymers; solution isoprene-butadiene-styrene terpolymers, emulsion isoprene-butadiene-styrene terpolymers, ethylene-propylene-diene terpolymers; and combinations thereof.

10. A method as claimed in claim 1, wherein said silane bonding agent has the following structural formula:

$$R_3\text{—Si—}C_nH_{2n}X \quad (I)$$

where:
R is an alkyl group comprising 1 to 4 carbon atoms, an alkoxy group comprising 1 to 4 carbon atoms or a chlorine atom;
n is a whole number from 1 to 6;
X is $-S_mC_{n'}H_{2n'}-Si-R'_3$, wherein m and n' are whole numbers from 1 to 6, and R' is an alkyl group comprising 1 to 4 carbon atoms, an alkoxy group comprising 1 to 4 carbon atoms or a chlorine atom.

11. A method as claimed in claim 10, wherein said bonding agent is selected from the group consisting of bis(3-triethoxysilyl-propyl)tetrasulfide and bis(3-triethoxysilyl-propyl)disulfide.

12. A curable-rubber mixture containing silica, for producing treads, obtained using the method as claimed in claim 2.

13. A tread, obtained from a mixture as claimed in claim 12.

14. A road vehicle tire, comprising a tread as claimed in claim 13.

15. A tire as claimed in claim 14, wherein the tire is a passenger road vehicle tire.

16. A method as claimed in claim 1, further comprising a remixing step in which no ingredients are added, and which is stopped when the remixture reaches a temperature ranging from 135° C. to 175° C., and a third step to obtain a third mixture by adding to and dispersing in the remixture, at least one curing agent; said third step being stopped at a temperature below a curing temperature of the third mixture.

17. A method as claimed in claim 1, further comprising a remixing step in which no ingredients are added, and which comprises one uninterrupted remixing comprised of a first part, in which said mixer is operated at a first mixing speed, the first part terminating when the remixture reaches a temperature ranging from 120° C. to 145° C., and a second successive part, in which the mixer is operated at a second mixing speed lower than the first mixing speed, the second part mixing speed maintaining the temperature of the remixture ranging from 150° C. to 165° C., and a third and a third step to obtain a third mixture by adding to, and dispersing in, the remixture at least one curing agent; said third step being stopped at a temperature below a curing temperature of the third mixture.

18. A method as claimed in claim 17, wherein said first mixing speed ranges from 50 to 80 rpm, whereas said second mixing speed ranges from 20 to 50 rpm; the difference between said two mixing speeds being at least 10 rpm.

19. A curable-rubber mixture containing silica, for producing treads, obtained using the method as claimed in claim 16.

20. A tread, obtained from a mixture as claimed in claim 19.

21. A road vehicle tire, comprising a tread as claimed in claim 20.

22. A tire as claimed in claim 21, wherein the tire is a passenger road vehicle tire.

23. A curable-rubber mixture containing silica, for producing treads, obtained using the method as claimed in claim 17.

24. A tread, obtained from a mixture as claimed in claim 23.

25. A road vehicle tire, comprising a tread as claimed in claim 24.

26. A tire as claimed in claim 25, wherein the tire is a passenger road vehicle tire.

27. A method as claimed in claim 1, and further comprising a second step to obtain a second mixture by adding to, and dispersing in, the first mixture at least one non-curing ingredient, wherein the second mixture is mixed in one uninterrupted mixing comprising a first part, in which said mixer is operated at a first mixing speed, the first part terminating on reaching a temperature ranging from 120° C. to 145° C., and a second successive part, in which the mixer is operated at a second mixing speed lower than the first mixing speed, the second part mixing speed maintaining the temperature ranging from 150° C. to 165° C.; and a third step to obtain a third mixture by adding to, and dispersing in, the second mixture at least one curing agent; said third step being stopped at a temperature below a curing temperature of the third mixture.

28. A method as claimed in claim 27, wherein said first mixing speed ranges from 50 to 80 rpm, whereas said second mixing speed ranges from 20 to 50 rpm; the difference between said two mixing speeds being at least 10 rpm.

29. A curable-rubber mixture containing silica, for producing treads, obtained using the method as claimed in claim 27.

30. A tread, obtained from a mixture as claimed in claim 29.

31. A road vehicle tire, comprising a tread as claimed in claim 30.

32. A tire as claimed in claim 31, wherein the tire is a passenger road vehicle tire.

33. A method of preparing curable-rubber mixtures containing silica, for producing treads, the method being characterized by comprising at least a first step to obtain a first mixture by simultaneously loading into a mixer and mixing together at least a cross-linkable unsaturated-chain polymer base, a silica reinforcing filler, and a silane bonding agent; said first step being stopped upon said first mixture reaching a temperature ranging from 155° C. to 175° C.; the method further comprising a second step to obtain a second mixture by adding to, and dispersing in, the first mixture at least one non-curing ingredient, wherein the second mixture is mixed in one uninterrupted mixing comprising a first part, in which said mixer is operated at a high first mixing speed, the first part terminating on reaching a temperature ranging from 120° C. to 145° C., and a second successive part, in which the mixer is operated at a second mixing speed lower than the first mixing speed, the second part mixing speed maintaining the temperature ranging from 150° C. to 165° C.; and the method further comprising a third step to obtain a third mixture by adding to, and dispersing in, the second mixture at least one curing agent; said third step being stopped at a temperature below a curing temperature of the third mixture.

34. A method as claimed in claim 33, wherein a carbon black reinforcing filler is added in said first step.

35. A method as claimed in claim 33, wherein the amount of silica reinforcing filler ranges from 20 to 85 parts by weight per 100 parts of polymer base.

36. A method as claimed in claim 33, wherein part of the silica reinforcing filler is also added in the second step.

37. A method as claimed in claim 36, wherein the amount of silica reinforcing filler added in the first step constitutes 50% to 75% by weight of the total amount of silica used.

38. A curable-rubber mixture containing silica, for producing treads, obtained using the method as claimed in claim 33.

39. A tread, obtained from a mixture as claimed in claim 38.

40. A road vehicle tire, comprising a tread as claimed in claim 39.

41. A tire as claimed in claim 40, wherein the tire is a passenger road vehicle tire.

* * * * *